(12) United States Patent
Deng et al.

(10) Patent No.: US 6,940,735 B2
(45) Date of Patent: Sep. 6, 2005

(54) POWER CONVERTER SYSTEM

(75) Inventors: Duo Deng, Canton, MI (US); Vijay Bhavaraju, Canton, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 83 days.

(21) Appl. No.: 10/713,767

(22) Filed: Nov. 14, 2003

(65) Prior Publication Data

US 2005/0105306 A1    May 19, 2005

(51) Int. Cl.[7] .............................................. H02M 5/45
(52) U.S. Cl. ........................... 363/37; 363/95; 290/46; 322/10
(58) Field of Search ............................ 363/37, 43, 56, 363/95, 97, 45, 40, 17, 26, 141, 133; 290/31, 290/46, 22; 322/10, 29

(56) References Cited

U.S. PATENT DOCUMENTS

| | | | |
|---|---|---|---|
| 4,142,231 A | 2/1979 | Wilson et al. ............... 363/141 |
| 4,661,897 A | 4/1987 | Pitel ............................. 363/17 |
| 4,742,441 A | 5/1988 | Akerson ....................... 363/97 |
| 4,899,270 A | 2/1990 | Bond ........................... 363/56 |
| 4,948,209 A * | 8/1990 | Baker et al. ................... 322/10 |
| 5,013,929 A * | 5/1991 | Dhyanchand ................. 290/31 |
| 5,097,195 A * | 3/1992 | Raad et al. .................... 322/10 |
| 5,155,672 A | 10/1992 | Brown .......................... 363/43 |
| 5,373,195 A | 12/1994 | De Doncker et al. ......... 307/45 |
| 5,546,742 A * | 8/1996 | Shekhawat et al. ........... 60/788 |
| 5,684,686 A | 11/1997 | Reddy .......................... 363/97 |
| 6,021,052 A | 2/2000 | Unger et al. .................. 363/26 |
| 6,038,156 A | 3/2000 | Inam et al. .................. 363/133 |
| 6,111,767 A * | 8/2000 | Handleman ................... 363/95 |
| 6,198,642 B1 | 3/2001 | Kociecki ...................... 363/37 |
| 6,572,416 B2 | 6/2003 | Patwardhan et al. ......... 439/736 |
| 6,583,996 B2 | 6/2003 | Deng et al. ................... 363/40 |
| 6,603,672 B1 | 8/2003 | Deng et al. ................... 363/37 |

* cited by examiner

Primary Examiner—Rajnikant B. Patel
(74) Attorney, Agent, or Firm—Seed IP Law Group PLLC

(57) ABSTRACT

A power converter system advantageously employs a modular, bi-directionally symmetrical power converter assembly in a readily customizable configuration to interconnect a direct current power source to a three-phase alternating power grid. Connections external to the power converter assembly are selected to optimize the power converter system for a specific application, such as interconnecting a photovoltaic array to the three-phase electrical power grid. The electrical interconnections of various elements including isolation transformers, voltage sensors, and control switches are optimized to improve efficiency and reliability.

16 Claims, 3 Drawing Sheets

POWER CONVERTER SYSTEM

BACKGROUND OF THE INVENTION

1. Field of the Invention

Figure 1A:
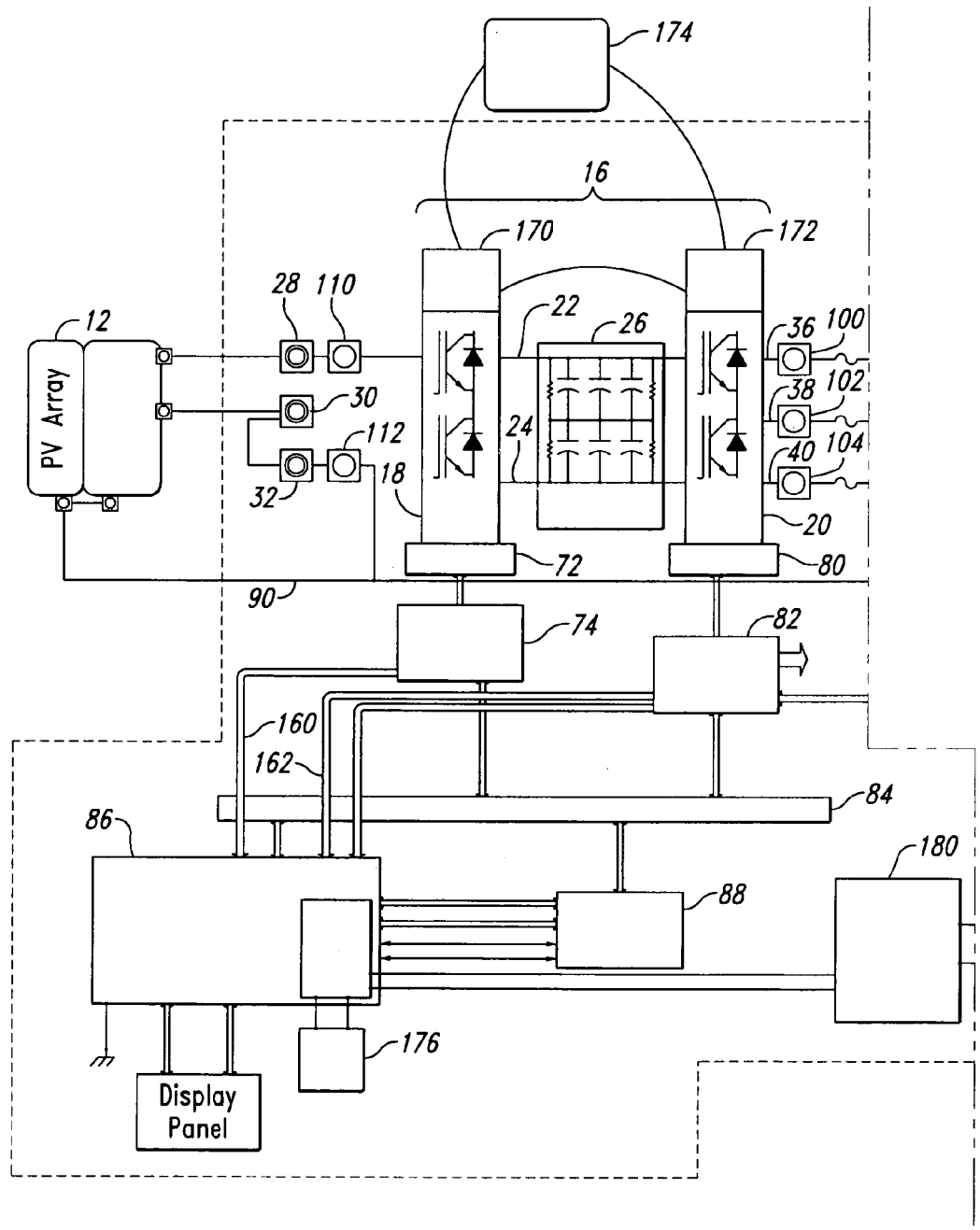

The present disclosure relates to electric power converter systems. More specifically, the disclosure relates to power converter systems suitable for interconnecting direct current output power sources (e.g., photovoltaic arrays) to a three-phase alternating current power grid.

2. Description of the Related Art

Electric power converter systems are used to transform and/or condition electrical power in a variety of applications. For example, electrical power converter systems may transform AC power from a power grid to a form suitable for a standalone application (e.g., powering an electric motor, lights, electric heater, household or commercial equipment, telecommunications equipment, computing equipment, uninterruptible power supply (hereinafter occasionally "UPS")). Also for example, electrical power converter systems may transform power from a standalone power source such as an array of photovoltaic cells, fuel cell system, micro-turbine, or flywheel, for use in a standalone application and/or for export to, or by, a power grid.

The electrical power converter system may comprise one or more subsystems such as an DC/AC inverter, DC/DC converter, and/or AC/DC rectifier. Typically, electrical power converter systems will include additional circuitry and/or programs for controlling the various subsystems; and for performing switching, filtering, noise and transient suppression, and device protection.

In many power conversion applications, it is highly desirable to realize the maximum efficiency possible. For example, in photovoltaic applications the cost of photovoltaic arrays is still relatively high, and the physical area occupied by photovoltaic arrays may be undesirably large, particular where real estate is at a premium. Thus it is desirable to use the least number of photovoltaic cells as possible to achieve the desired power output.

In many power conversion applications power source outputs are variable or periodic in nature. For example, typical photovoltaic applications are strongly influenced by the relative movement of the sun. The time that the sun rises and/or sets, and the relative position of the sun in the sky throughout the day, determines the amount of power that the photovoltaic cells may generate. Further, the relative position of the sun throughout the year determines the amount of power the photovoltaic cells may generate, and determines the time of sunrise and sunset.

Finally, the combined cost of the power converter and the direct current generating source (e.g., photovoltaic array) are to be considered as a system. It is anticipated that the cost of photovoltaic arrays, for example, will decline. Thus, the relative cost of the power converter itself will become a more significant component of the entire system cost. Currently, the cost of power converters themselves is unnecessarily high due to the lack of generality, and high specificity of power converter designs for different applications. This lack of generality in power converter designs (i.e., highly use-specific engineering) prevents significant cost savings which may be derived from production of a generalized design which is applicable to a multiplicity of purposes.

By way of example and historical explanation, converter systems initially were purpose-built for specific applications. One early type of power converter was specifically designed for inverting direct current, constant voltage sources (e.g., batteries) to alternating current outputs (e.g., for operation of AC motors). Converters of this type are termed "inverters" and they have been in the simple form of transformers interconnecting a DC power supply with a plurality of logic control switches to generate the necessary alternating current waveform. A rectifier is another type of power converter for converting alternating current to direct current. Rectifiers have proven themselves especially useful for adapting household 110 volt alternating current to 12-volt direct current for operation of battery-powered appliances. Devices of this type have been as simple as a step-down transformer connected to a diode bridge and smoothing capacitor for full-wave rectification. U.S. Pat. No. 6,021,052 to Unger et al. entitled "DC/AC Power Converter," issued on Feb. 1, 2000, disclosed a more sophisticated implementation of an AC to DC rectifier, including discrete components (both analog and digital) for converting direct current power to alternating current power, suitable for driving an AC load which is otherwise in series with an AC power supply. Separately, direct current to direct current (hereinafter occasionally "DC—DC") converters have been provided for conditioning direct current power from a variable power source (e.g., a wind-driven direct current motor, photovoltaic panel or the like) for charging a battery or array of batteries.

All of the above equipment was typically purpose-built for each specific application and optimized therefore. Thus, a homeowner attempting to establish an off-the-grid power supply system may have required all three converter devices to establish a complete power system supply. By way of example, a homeowner desiring to produce power from a large photovoltaic array, may have required a DC—DC power conditioner for charging a direct current battery bank from the photovoltaic array, and a separate inverter for operating alternating current appliances from the charged, direct current battery bank so as to provide an off-the-grid power supply system. If the homeowner is located adjacent to a public power mains (three-phase power grid), the homeowner may require an AC to DC rectifier device to charge the batteries when the photovoltaic array is inoperative (e.g., at night). In order to effectively utilize a system as described above having discrete components, operator intervention is required to switch from a first mode in which the photovoltaic array charges the batteries, to a second mode in which the inverter operates an AC appliance from the charged batteries, to a third mode in which the DC batteries may be charged from the AC power grid.

In order to overcome some of the above limitations, bi-directional power converters have been developed, enabling a single power converter assembly to selectively and automatically drive an AC element (such as a motor) from a DC source (such as a battery) while utilizing the same topology to charge the DC battery when the AC element is acting as a power source (e.g., a generator or AC power main). A switching power converter of this type is disclosed by Akerson in U.S. Pat. No. 4,742,441 entitled "High-Frequency Switching Power Converter," and issued on May 3, 1988. The switching power converter disclosed by Akerson utilizes pairs of bi-directional switches in the form of common-gated, source-to drain connected field effect transistors (FETs) driven by discrete analog and digital circuitry. By employing pulse-width modulation of the appropriately selected FETs, a sinusoidal output (or any other periodic, alternating current output) can be generated from the DC source so as to power an inductor, thereby generating the desired alternating current waveform for application to the AC element. Thus, Akerson teaches a method for converting a known DC power supply to phase and amplitude locked AC power for application to an AC power grid, and for automatically recharging the DC power supply when the DC power supply voltage falls below a predetermined level. The device disclosed by Akerson, however, is not adaptable to a DC power supply having a variable power input (such as a photovoltaic array) nor is it readily adaptable either mechanically or electrically to a different power supply (e.g., an alternating current generator motor combination). Thus, different topology and hardware is required when attempting to integrate various and diverse power supplies with, for example, an AC power grid.

UPS systems have been developed which permit power to be converted from a direct current power supply to the AC grid, and for recharging the DC power supply from the AC grid through the same apparatus. A UPS system of this type is disclosed by Unger et al. in U.S. Pat. No. 6,021,052 entitled "DC/AC Power Converter," issued on Feb. 1, 2000. Unlike the prior art discussed above, the device disclosed by Unger et al. is capable of adapting to a variety of DC power sources by converting the variable DC input to a desired DC voltage on a DC bus. A separate system then converts the now regulated DC voltage on the DC bus into AC power for interfacing with an AC source (e.g., the AC power grid) or upon operation of a transfer switch, an AC load (such as a motor). Nevertheless, the device and topology disclosed by Unger et al. is neither adaptable nor readily modified for accepting, for example, an AC source input, nor is the electrical logic adaptable for use with a variety of different power inputs due to the heavy reliance on discrete analog and digital components for controlling the system. Thus, efficiencies of scale cannot be achieved with the device disclosed by Unger et al. because there is still a requirement to develop discrete circuits for both power handling and logical control for integrating a variety of different power sources with the AC grid.

Therefore, a need exists for a power converter topology which is readily adaptable for interfacing a variety of power sources (e.g., constant voltage DC, variable voltage DC) with a three-phase AC power grid.

A further need exists for a power converter system which addresses the above needs while being readily adaptable for optimization of power transfer characteristics when the power converter system is applied to a single input, such as a photovoltaic array.

BRIEF SUMMARY OF THE INVENTION

In one aspect, a power converter system comprises first and second converters each comprising a plurality of active, commonly gated switches and associated passive unidirectional current devices, wherein the first converter comprises a three phase input, the second converter comprises a three phase output and each converter is capable of selective, three phase passive and active rectification/inversion; a direct current bus electrically interconnecting the first and second converters; an interface to electrically connect the direct current output device to the first converter; control means, operatively connected to the converter switches, for operating the first converter as a passive unidirectional current blocking element and for operating the second converter as an active inverter; a three phase isolation transformer comprising primary and secondary sides, wherein the primary side is electrically connected to the second converter; and, a three phase controllable switch, operatively connected to the control means, for selectively connecting and disconnecting the power converter system from the power grid, wherein the controllable switch has a three phase input side electrically connected to the secondary side of the isolation transformer and a three phase output side electrically connectable to the power grid, whereby current from the direct current output device excites the isolation transformer when the controllable switch is open so that the isolation transformer does not draw current from the power grid, and whereupon closing the controllable switch potential power surges from the power grid to the converter system are minimized.

In another aspect, a method for optimizing integration of a direct current generating device with a three phase power grid comprises providing a power conversion system comprising first and second converters each being capable of selective three phase passive and active rectification/inversion; connecting a direct current generating device to two grounded phases of the first converter and one remaining phase of the first converter; electrically interconnecting the converters with a direct current bus; preventing current flow from the power grid to the direct current generating device when the device is generating insufficient voltage and current by operating the first converter as a blocking diode; and, providing three phase current for the power grid from the direct current generating device by operating the second converter as a phase locked inverter.

BRIEF DESCRIPTION OF THE SEVERAL VIEWS OF THE DRAWING(S)

Figure 1B:
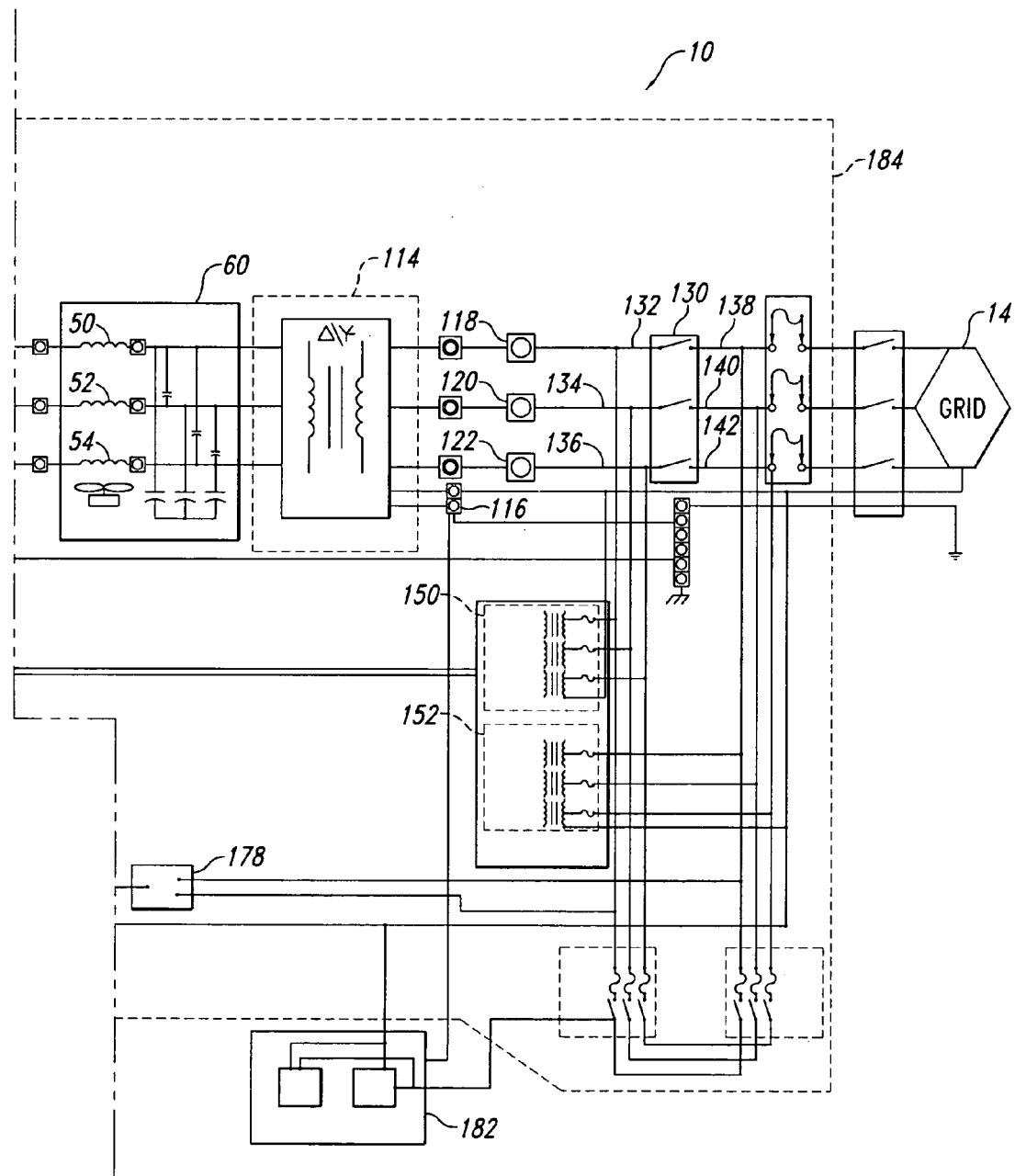

FIGS. 1A and 1B (hereinafter collectively referred to as FIG. 1) are a schematic representation of a power converter system employing the principles of the present disclosure.

Figure 2:
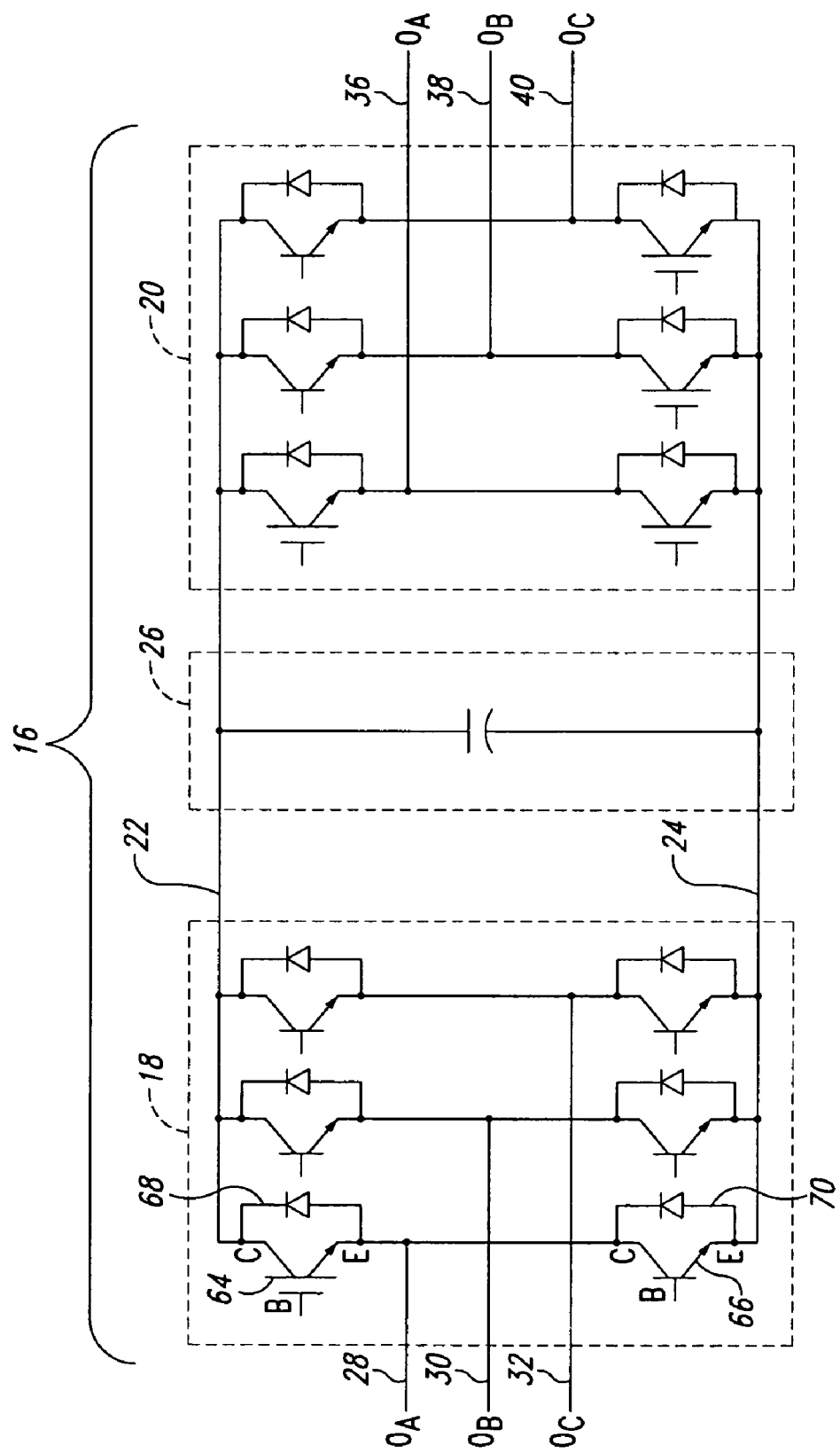

FIG. 2 is a component level schematic diagram of first and second converters interconnected by a DC bus having a symmetrical topology employed by the power converter system of FIG. 1.

DETAILED DESCRIPTION OF THE INVENTION

A power converter system employing the principles of the present disclosure is generally indicated at reference numeral 10 in FIG. 1 wherein reference numerals herein correspond to like-numbered elements in the various figures. In the following discussion, certain specific details are set forth in order to provide a thorough understanding of various embodiments of the invention. However, one of ordinary skill in the art will understand that the invention may be practiced without these details. In other instances, well-known structures associated with power converter systems have not been shown or described in order to avoid unnecessarily obscuring descriptions of embodiments of the invention, unless the context requires. Otherwise, throughout the specification and claims which follow, the word "comprise" and variations thereof, such as "comprises" and "comprising," are to be construed in an open and inclusive sense, that is as "including, but not limited to." Reference throughout the specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout the specification are not necessarily referring to the same embodiment. Headings are provided herein for convenience only and do not interpret or limit the scope or meaning of the claimed invention.

In one aspect, the present disclosure teaches a universal power converter topology for interconnecting a power supply with a three-phase alternating current power grid which is readily adaptable to a variety of direct current and alternating current power supplies.

In another aspect, the present disclosure teaches a universal power converter which is readily optimized for interconnecting a photovoltaic array with a three-phase alternating current power grid.

In yet another aspect, the present disclosure teaches a universal power converter which does not draw current from the power grid when the photovoltaic array is not producing power, and which accurately monitors voltage phase and amplitude information from the power converter and from the power grid for accurate synchronization of the voltage phase, frequency and amplitude.

In still a further aspect, the present disclosure teaches a power converter system for interconnecting a direct current output device (e.g., a photovoltaic array) with a three-phase power grid. The system comprises first and second converters interconnected by direct current electrical bus. Each converter is capable of selective, three-phase passive and active rectification/inversion. The converters are interconnected by a DC bus. One or more controllers are provided for intelligently operating the first and second converters, wherein the first converter is adapted for accepting direct current from the direct current power supply and the second converter is adapted for producing three-phase alternating current having a desired amplitude, frequency and phase relationship from the DC bus.

In at least one embodiment, the first converter is operated solely as a blocking diode, when the direct current output device is a photovoltaic array. An isolation transformer may be provided between the second converter and the three-phase power grid. A controllable three-phase switch may connect the isolation transformer to the three-phase grid and disconnects the power converter system from the grid when the direct current output source generates insufficient power to drive the second converter at the desired voltage and/or current. In this manner, the isolation transformer does not draw power from the grid when the power converter system is disconnected therefrom. In addition, inverter voltage sensors measure the output from the isolation transformer on each phase just prior to the controllable switch, while grid voltage sensors measure grid voltage on each phase just after the controllable switch. Information from the voltage sensors is input to the controllers for the first and second converters. Thus, information regarding the output of the power converter system in terms of voltage, amplitude, and frequency (for each phase) and power grid voltage, amplitude and frequency (for each phase) is accurately monitored such that the power converter system can be accurately phase and amplitude synchronized with the power grid.

In one or more embodiments, the topology of the first and second converters is symmetrical with respect to the intermediate DC bus. As recited above, each converter is capable of selective, three-phase passive and active rectification/conversion. Nevertheless, inputs to the first converter are arranged such that only one of the three input phases is used for commutation of DC positive voltage, whereas the other two phases are connected together in a ground in common with the isolation transformer, the power grid, and the photovoltaic array. Thus, the same structural topology which is useful for interconnecting a photovoltaic array to a three-phase power grid is also useful with only minor modification for interconnecting a steady state DC power supply with the three-phase AC grid, a three-phase AC input with the three-phase AC grid, as well as a variable direct current power supply such as a photovoltaic array, fuel cell, or the like with the AC grid only minor modification. As a result, efficiencies of scale with respect to manufacturing costs result in a lower end cost to the consumer of the power converter system.

The power converter system 10 is useful for connecting a direct current output device or power source 12 to a three-phase power grid 14 such as the public power system. The power converter system advantageously utilizes a power converter assembly generally indicated at reference numeral 16 and shown in greater detail in FIG. 2. The power converter assembly comprises a three-phase first converter 18 and a three-phase second converter 20 which are interconnected by a DC bus having conductors 22, 24. A capacitor bank 26 interconnects conductors 22, 24 of the DC bus to minimize transient DC signals between the first and second converters.

Each converter 18, 20 comprises three-phase input/outputs 28, 30, 32 and 36, 38, 40 associated with three phases $\phi_A$, $\phi_B$, and $\phi_C$. Each converter has the ability to accept three-phase alternating current signals and to rectify the same for application to the DC bus conductors 22, 24. Such rectification may be passive (i.e., full-wave rectification at the magnitude of the input voltage) or active wherein the resulting DC signal has a voltage in excess of the alternating current input amplitude provided that the power converter is associated with an inductor with respect to each phase (such as inductors 50, 52, 54 associated with a three-phase line filter 60).

A power converter assembly 16 of the type shown in FIGS. 1 and 2 is described in detail in U.S. Pat. No. 6,603,672 to Deng et al., entitled "Power Converter System," issued Aug. 5, 2003, the disclosure of which is incorporated herein by reference.

It is sufficient for the purposes of this disclosure, and with reference to FIG. 2, to indicate that each converter 18, 20 comprises a pair of integrated gate bipolar transistors 64, 66 connected as an emitter-collector pair and connected between the DC bus conductors 22, 24. Such a pair is associated with each phase, $\phi_A$, $\phi_B$, $\phi_C$. Each transistor 64, 66 includes an associated shunt diode 68, 70 having its respective anode connected to the emitter of each transistor 64, 66, and its respective cathode connected to each collector of each transistor 64, 66. Each gate of the transistor pairs associated with first converter 18 is operatively coupled through a first converter gate drive 72 to a first controller (or front end controller) 74. Similarly, each gate of the integrated gate bipolar transistors associated with the second converter 20 is operatively connected through a second converter gate drive 80 to a second controller (or main inverter controller) 82.

The controllers 74, 82 communicate with one another through an internal control area network 84, an interface terminal block board 86, and an interface unit 88 so that the activation of the transistor gates can be coordinated and operated according to a preprogrammed sequence in a manner well known to those of ordinary skill in the art. Briefly stated, whenever the gates of the transistors associated with either of the first or second converter 18, 20 are deactivated, the converters act as a full-wave rectifying diode bridge providing passive rectification of three-phase power which might appear on $\phi_A$, $\phi_B$, and $\phi_C$. When the gates are activated according to a preprogrammed pulse width modulation (PWM) sequence, three-phase alternating current signals which might appear on $\phi_A$, $\phi_B$, and $\phi_C$ can be boost rectified (sometimes termed active rectification) to a larger magnitude direct current voltage on the DC bus 22, 24, than the magnitude of the alternating current input signal. Finally, the gates of the transistors of either first or second controller 18, 20 can be operated such that DC power appearing across the DC bus conductors 22, 24 can be converted into three-phase, alternating current voltage on any of the input/outputs 28, 30, 32 or 36, 38, 40 again using pulse width modulation under instructions from the first and second controller 74, 82. It is to be understood that each of these modes of operation are not used when the power converter assembly 16 is adapted for use with respect to a specific direct current power source as opposed to a more generic alternating current power source or the like. Thus, a single power converter topology is adaptable to a variety of specific applications.

Those of ordinary skill in the art will appreciate the numerous advantages which accrue from this topology. In addition to the manufacturing costs which are saved by only having to produce a single converter assembly for different applications, the converter assemblies 16 are easily scalable for increased power handling merely by placing multiple converter assemblies in parallel. The symmetrical arrangement of the first and second power converters 18, 20 on each side of the DC bus provides conditioned, regulated DC voltage to be drawn from the DC bus, or supplied to the DC bus from a variety of DC sources/loads (e.g., batteries, fuel cells, flywheel actuated DC motor-generators, etc.).

With respect to the embodiment shown in FIG. 1, the power converter system 10 has been adapted for interconnecting a photovoltaic array in the form of the direct current power source 12 with the three-phase AC power grid 14. In this embodiment, only minor structural modifications to the input/outputs of the first controller 18 are necessary to optimize operation of the first converter as a blocking diode. Specifically, inputs/outputs 30, 32 relating to $\phi_B$ and $\phi_C$ are connected together and to a common ground 90 which also serves as ground for the photovoltaic array, direct current power source 12 and other elements of the power converter system 10. The first controller 74 operates the transistor gates of the first converter 18 associated with $\phi_B$ and $\phi_C$ such that transistor pairs associated therewith are inoperative. Thus, only shunt diodes 68, 70 are electrically operative (i.e., forward biased) and are connected to a positive voltage output of the photovoltaic array 12. Conversely, the gates of the transistors associated with the second converter 20 are operated by the second controller 82 such that the second converter 20 operates as a synchronous inverter supplying three-phase, alternating current of a desired frequency and amplitude to the three-phase line filter 60. The current associated with each phase is monitored by output current sensors 100, 102, and 104 which are operatively connected to the second controller 82. Input current sensors 110, 112 are connected to $\phi_A$ and $\phi_C$ respectively by the first converter 18 and also operatively associated with input/outputs 28 and 32 for monitoring the current output of the direct current power source, photovoltaic array 12 and communicate through the first controller 74 to the interface terminal block board 86. Each of the controllers 74, 82 communicates through the internal control area network 84 with other elements in the system 10.

The three-phase, harmonically filtered output of line filter 60 is received by a three-phase, delta-Y configuration isolation transformer 114 which has a slight step-up ratio from 187 volts on the input side (primary side) to 208 volts on the output (secondary) side. A neutral 116 of the secondary side is also connected to the common ground 90. Current sensors 118, 120, and 122 monitor the current output from the secondary side of the isolation transformer 114 with respect to each phase and are in communication with the internal control area network 84 and interface terminal block board 86.

A three-phase controllable switch or contactor 130 comprises inputs 132, 134, and 136 electrically connected through the current sensors 118, 120, 122 to each corresponding phase of the secondary side of the isolation transformer 114. Outputs 138, 140 and 142 interconnect the controllable switch 130 with the three-phase power grid 14. The controllable switch 130 is operatively interconnected with the internal control area network 84 and the interface terminal block board 86 for cooperative operation with the second converter 20 such that the controllable switch is only closed (thereby selectively interconnecting the photovoltaic array 12 with the power grid 14) when voltage on the DC bus 22, 24 is within a prescribed range, and the second controller 82 operates the gates on the transistors of the second converter 20 so as to produce phase-locked, alternating current voltage on the inputs 132, 134 and 136 of the controllable switch 130 with respect to the power grid 14. To this end, the power converter system 10 is provided with second converter voltage sensors 150 connected to each phase of the secondary side of the isolation transformer 114 and controllable switch inputs 132, 134 and 136, respectively. The second converter voltage sensors 150 are operatively interconnected with the second controller 82 for appropriate synchronization and operation of the gates of the second converter 20. Similarly, grid voltage sensors 152 are associated with and electrically connected to each phase of the power grid 14 at the outputs 138, 140, and 142 of the controllable switch 130 for measuring the amplitude, phase, and frequency of each phase of the power grid. The grid voltage sensors 152 are also in operative communication with the second controller 82 so that the power output of the isolation transformer 114 with respect to each phase can be synchronized with the power grid 14 with respect to amplitude, frequency, and phase shift. By advantageously monitoring each of the three phases on the input and output sides of the controllable switch 130 immediately after the isolation transformer 114 and immediately prior to the power grid 14, accurate information regarding these parameters can be provided to the second controller 82 such that artifacts, transients, harmonics, etc. which may appear at the inputs/outputs 36, 38, and 40 of the second converter 20 do not adversely affect the phase, amplitude, voltage and phase shift locking of the power converter system 10 with respect to the power grid 14.

Additional advantages are achieved by the structure described above. By way of example and not by limitation, those of ordinary skill in the art will appreciate that by positioning the controllable switch 130 between the power grid 14 and the output the isolation transformer 114, the secondary winding of the isolation transformer will not draw current from the grid when the internal control area network 84 commands control of the switch 130 to decouple the power converter system 10 from the power grid 14. Thus, the power converter system is highly efficient when in a quiescent state. Furthermore, the power converter assembly 16, the gate drives 72, 80, the controllers 74, 82, and the internal control area network 84, internal terminal block board 86 are standardized units which are usable with only minor modification in UPS applications, direct current charging applications (e.g., when a rechargeable direct current power supply is connected to the DC bus conductors 22, 24) and for use when the direct current power source 12 is either a constant or variable voltage supply. Only the wiring of input/outputs 28, 30, 32 and 36, 38, 40 need be rearranged by appropriate jumpers. Furthermore, the first or second converter 18, 20 can be operated in a variety of different modes merely by inserting the appropriate programming into the first and second controller 74, 82 by way of RS232 programming ports 160, 162. Such programming may be introduced to the power converter system 10 through the interface unit 88 in a conventional manner. Thus, economies of scale with respect to production costs can be achieved by utilizing the same power converter assembly 16 for a variety of different applications.

As will also be appreciated by those of ordinary skill in the art, the advantageous placement of the isolation transformer 114 between the second converter 20 and the controllable switch 130 provides for the preliminary excitation of the primary winding of the isolation transformer 114 by the photovoltaic array 12 when the controllable switch 130 is open and the power converter system is disconnected from the power grid 14. Upon closing the controllable switch 130 (such as when the photovoltaic array 12 provides sufficient power to the DC bus capacitors 26) powerful current surges from the power grid 14 through the isolation transformer 114 to the line filter 60 are substantially reduced or avoided. By constantly moving the power grid at the controllable switch outputs 138, 140 and 142, the interface terminal block board 86 and internal control area network 84 can detect power grid 14 over/under voltage and frequency faults without subjecting the power converter system 10 circuitry to such anomalous conditions, including the detection of a grid fault (e.g., grid short) in a single phase. By controlling the gates of each converter 18, 20 with separately programmable controllers 74, 82 it is possible to provide user selectable output power limits for converter testing and commissioning.

Those of ordinary skill in the art, upon reviewing the above disclosure, will appreciate that other and various embodiments employing the general principles of the invention described above are contemplated and fall within the scope of this disclosure. For example, when operating at power ratings up to 75 kilowatts, the first and second converters 18, 20 are preferably provided with conventional cold plates 170, 172 which are operatively connected to a cooling system 174. Such cooling systems may be entirely conventional and thus fully understood by those of ordinary skill in the art. Additionally, those of ordinary skill in the art will appreciate that the interface terminal block board 86 may be advantageously provided with a 12-volt DC battery backup 176 which is powered from either $\phi_A$ of the power converter system 10 when offline and operating from the photovoltaic array 12 by tapping electrical power at input 132 of the controllable switch 130, or by tapping $\phi_A$ from the power grid 14 at the output 138 of the controllable switch 130. An appropriate relay 178 may supply the $\phi_A$ power from either the power converter system 10 or the power grid 14 to a low-voltage power supply 180 wherein a two position relay 178 is under control of the internal control area network 84 and interface terminal block board 86. Further yet, a fan and pump combination 182, again powered by either $\phi_A$ voltage from the power converter system 10 or the power grid 14 may comprise the cooling system 174 and also be electrically interconnected with the low-voltage power supply 180.

Finally, those of ordinary skill in the art will appreciate that by placing the isolation transformer 114 outside of a metal enclosure graphically illustrated at reference numeral 184, heat from the transformer may be dissipated outside of the power converter system 10. The transistor may also be readily repaired or replaced.

From the foregoing it will be appreciated that, although specific embodiments of the invention have been described herein for purposes of illustration, various modifications may be made without deviating from the spirit and scope of the invention. Thus, the invention is not to be limited by the above disclosure, but is to be determined in scope by the claims which follow.

What is claimed is:

1. A power converter system for interconnecting a direct current output device with a three phase power grid, comprising:
    first and second converters each comprising a plurality of active, commonly gated switches and associated passive unidirectional current devices, wherein the first converter comprises a three phase input, the second converter comprises a three phase output and each converter is capable of selective, three phase passive and active rectification/inversion;
    a direct current bus electrically interconnecting the first and second converters;
    an interface to electrically connect the direct current output device to the first converter;
    control means, operatively connected to the converter switches, for operating the first converter as a passive unidirectional current blocking element and for operating the second converter as an active inverter;
    a three phase isolation transformer comprising primary and secondary sides, wherein the primary side is electrically connected to the second converter; and,
    a three phase controllable switch, operatively connected to the control means, for selectively connecting and disconnecting the power converter system from the power grid, wherein the controllable switch has a three phase input side electrically connected to the secondary side of the isolation transformer and a three phase output side electrically connectable to the power grid, whereby current from the direct current output device excites the isolation transformer when the controllable switch is open so that the isolation transformer does not draw current from the power grid, and whereupon closing the controllable switch potential power surges from the power grid to the converter system are minimized.

2. The power converter system of claim 1, wherein the commonly gated switches are integrated gate bipolar transistors, and wherein the passive unidirectional current devices are diodes.

3. The power converter system of claim 1, wherein the direct current output device is grounded and wherein the isolation transformer has a delta-Y configuration comprising a common ground with the direct current output device and with the power grid.

4. The power converter system of claim 3, wherein two of the three input phases of the first converter are electrically connected to each other and to the common ground.

5. The power converter system of claim 1, further comprising converter voltage sensors for each phase, operationally connected to the control means and electrically connected between the input side of the controllable switch and the secondary side of the isolation transformer for monitoring voltage amplitude and phase from the second converter, and grid voltage sensors for each phase operationally connected to the control means and electrically connected to the output side of the controllable switch for monitoring voltage amplitude and phase of the power grid so that the control means can accurately phase and amplitude lock the power converter system to the power grid.

6. The power converter system of claim 1, wherein the direct current output device is a photovoltaic array.

7. A power converter system for interconnecting a photovoltaic array with a three phase power grid, comprising:
first and second converters wherein each converter is capable of selective, three phase passive and active rectification/inversion;
a direct current bus electrically interconnecting the first and second converters;
an interface to electrically connect the photovoltaic array to the first converter;
control means, operatively connected to the converters, for operating the first converter as a passive unidirectional current blocking element and for operating the second converter as an active inverter;
a three phase isolation transformer comprising primary and secondary sides, wherein the primary side is electrically connected to the second converter; and,
a controllable switch, operatively connected to the control means, for selectively connecting and disconnecting the power converter system from the power grid, wherein the controllable switch has a three phase input side electrically connected to the secondary side of the isolation transformer and a three phase output side electrically connectable to the power grid, whereby the isolation transformer does not draw current from the power grid when the controllable switch is open, and whereupon closing the controllable switch potential power surges from the power grid to the converter system are minimized.

8. The power converter system of claim 7, wherein the first and second converters each have a plurality of active, commonly gated switches and associated passive unidirectional current devices.

9. The power converter system of claim 8, wherein the commonly gated switches are integrated gate bipolar transistors, and wherein the passive unidirectional current devices are shunt diodes.

10. The power converter system of claim 7, wherein the photovoltaic array is grounded and wherein the isolation transformer has a delta-Y configuration comprising a common ground with the photovoltaic array and with the power grid.

11. The power converter system of claim 10, wherein the first converter has a three phase input and two of the input phases of the first converter are electrically connected to each other and to the common ground.

12. The power converter system of claim 7, further comprising converter voltage sensors for each phase, operationally connected to the control means, and electrically connected between the input side of the controllable switch and the secondary side of the isolation transformer for monitoring voltage amplitude and phase from the second converter, and grid voltage sensors for each phase, operationally connected to the control means, and electrically connected to the output side of the controllable switch for monitoring voltage amplitude and phase of the power grid so that the control means can accurately phase and amplitude lock the power converter system to the power grid.

13. A method for optimizing integration of a direct current generating device with a three phase power grid, comprising:
providing a power conversion system comprising first and second converters each being capable of selective three phase passive and active rectification/inversion;
connecting a direct current generating device to two grounded phases of the first converter and one remaining phase of the first converter;
electrically interconnecting the converters with a direct current bus;
preventing current flow from the power grid to the direct current generating device when the device is generating insufficient voltage and current by operating the first converter as a blocking diode; and,
providing three phase current for the power grid from the direct current generating device by operating the second converter as a phase locked inverter.

14. The method of claim 13, wherein the direct current generating device is a photovoltaic array.

15. The method of claim 13, further comprising providing the power conversion system with a three phase controllable switch comprising a switch input connected to the system and a switch output connected to the power grid, and monitoring system voltage on each phase independently and adjacent to the switch input and monitoring power grid voltage on each phase independently and adjacent to the switch output for phase and amplitude locking electrical output from the second converter with the power grid.

16. The method of claim 15, comprising electronically connecting an isolation transformer to the power conversion system between the input of the controllable switch and the second converter so that the isolation transformer does not draw current from the power grid when the controllable switch is open, and whereupon closing the controllable switch potential power surges from the power grid to the converter system are minimized.

\* \* \* \* \*